(12) United States Patent
Mukherjee (10) Patent No.: US 8,138,888 B2
(45) Date of Patent: Mar. 20, 2012

(54) SYSTEM AND METHOD FOR ADJUSTING A SEAT USING BIOMETRIC INFORMATION

(75) Inventor: Maharaj Mukherjee, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 989 days.

(21) Appl. No.: 12/115,050

(22) Filed: May 5, 2008

(65) Prior Publication Data
US 2009/0273213 A1    Nov. 5, 2009

(51) Int. Cl.
| G05B 19/00 | (2006.01) |
| G05B 23/00 | (2006.01) |
| G06F 7/00 | (2006.01) |
| G06F 7/04 | (2006.01) |
| G08B 29/00 | (2006.01) |
| G08C 19/00 | (2006.01) |
| H04B 1/00 | (2006.01) |
| H04B 3/00 | (2006.01) |
| H04Q 1/00 | (2006.01) |
| H04Q 9/00 | (2006.01) |

(52) U.S. Cl. .......... 340/5.82; 340/5.8; 340/5.81
(58) Field of Classification Search .......... 340/5.8–5.83
See application file for complete search history.

(56) References Cited

U.S. PATENT DOCUMENTS

| 4,204,255 A | 5/1980 | Cremer |
| 4,460,217 A | 7/1984 | Tsuda et al. |
| 4,660,140 A | 4/1987 | Illg |
| 5,098,160 A | 3/1992 | Moore et al. |
| 5,504,675 A | 4/1996 | Cragun et al. |
| 5,584,546 A | 12/1996 | Gurin et al. |
| 5,812,399 A | 9/1998 | Judic et al. |
| 5,915,246 A | 6/1999 | Patterson et al. |
| 6,061,646 A | 5/2000 | Martino et al. |
| 6,253,134 B1 * | 6/2001 | Breed et al. ............. 701/49 |
| 6,523,743 B1 | 2/2003 | Patterson et al. |
| 6,590,354 B2 | 7/2003 | Hein |
| 6,616,238 B1 | 9/2003 | Guery-Strahm |
| 6,619,545 B2 | 9/2003 | Harris |
| 6,663,010 B2 | 12/2003 | Chene et al. |
| 6,775,603 B2 | 8/2004 | Yester et al. |
| 6,824,219 B2 | 11/2004 | Ruckstadter |
| 6,874,855 B2 | 4/2005 | Nivet |
| 6,895,316 B2 | 5/2005 | Chen et al. |
| 6,944,679 B2 * | 9/2005 | Parupudi et al. ............. 709/246 |
| 7,161,490 B2 | 1/2007 | Huiban |
| 7,163,263 B1 | 1/2007 | Kurrasch et al. |
| 7,170,400 B2 | 1/2007 | Cowelchuk et al. |
| 2004/0195876 A1 | 10/2004 | Huiban |
| 2005/0121959 A1 | 6/2005 | Kruse et al. |
| 2005/0225150 A1 | 10/2005 | Saulnier et al. |

* cited by examiner

Primary Examiner — Daniel Wu
Assistant Examiner — John Bamert
(74) Attorney, Agent, or Firm — Cantor Colburn LLP; Steven Capella (57) ABSTRACT

A method for adjusting a seat that includes one or more adjustable physical features includes for each person within a plurality of persons, calibrating the seat by determining a preferred setting for each of the one or more adjustable physical features of the seat; utilizing the determined preferred settings to determine a cluster from among a plurality of clusters within which each of the plurality of persons is placed; identifying one of the persons; and for the identified person, adjusting each of the one or more physical features of the seat to the preferred setting depending on the one of the plurality of clusters that the identified person is placed in.

20 Claims, 6 Drawing Sheets

SYSTEM AND METHOD FOR ADJUSTING A SEAT USING BIOMETRIC INFORMATION

BACKGROUND

The present invention relates generally to the adjustment of a seat and, more particularly, to a system and method for adjusting a seat used on commercial airplanes and the like, where the system and method utilize biometric information of each one of a plurality of people to adjust the seat to make it relatively more ergonomically efficient and comfortable for each person sitting in the seat.

There exist situations where a person must sit for an extended period of time in a seat that has less than optimum or undesirable ergonomic capability and/or efficiency and comfort. An example of this is an airplane seat, which are typically identical to one another in their physical features or components on any given type of aircraft with little variance in these features between different types and manufactures of aircraft. A common airplane seat has a limited number of physical features that are manually adjustable by the user, whether in "coach" or in "first" class. Further, these features have relatively few manual adjustment capabilities. In general, a cross-section of the general population of people who sit in the typical airplane seat vary in their physical characteristics (e.g., height, weight, shape of torso, size and length of arms, legs, etc.) to a greater degree than the corresponding adjustment capabilities of the airplane seat. Nevertheless, a typical airplane passenger can usually find some degree of relative comfort through manual adjustment of the adjustable features of the seat.

The adjustable airplane seat features commonly include the angle of inclination of the seat back, the height, tilt angle and possibly the curvature of the headrest, the positioning of one or more armrests through an approximate ninety-degree angle of rotation, and, if available, the position of a legrest also through an approximate ninety-degree angle of rotation. Oftentimes passengers in these seats fail to take advantage of the adjustment capabilities, for whatever reason. Also, those people that do adjust their seats may not find the most comfortable position. Further, airline regulator rules require that each seat on an airplane be in a certain position during particular times of the flight (e.g., takeoff, landing, during turbulence, etc.). As a result, people sitting in airplane seats for a relatively extended period of time are likely to be or become uncomfortable during or throughout the duration of the flight, particularly those flights lasting a relatively long time. This often makes the passengers in these seats prone to fatigue, emotional distress and physical injury.

SUMMARY

The foregoing discussed drawbacks and deficiencies of the prior art are overcome or alleviated, in an exemplary embodiment, by a method for adjusting a seat that includes one or more adjustable physical features, the method including for each person within a plurality of persons, calibrating the seat by determining a preferred setting for each of the one or more adjustable physical features of the seat; utilizing the determined preferred settings to determine a tight cluster from among a plurality of tight clusters within which each of the plurality of persons is placed; identifying one of the persons; and for the identified person, adjusting each of the one or more physical features of the seat to the preferred setting depending on the one of the plurality of clusters that the identified person is placed in.

In another embodiment, a computer program product includes a computer readable computer program code for implementing a method for adjusting a seat that includes one or more adjustable physical features; and instructions for causing a computer to implement a method for adjusting a seat that includes one or more adjustable physical features, the method further including for each person within a plurality of persons, calibrating the seat by determining a preferred setting for each of the one or more adjustable physical features of the seat; utilizing the determined preferred settings to determine a tight cluster from among a plurality of tight clusters within which each of the plurality of persons is placed; identifying one of the persons; and for the identified person, adjusting each of the one or more physical features of the seat to the preferred setting depending on the one of the plurality of clusters that the identified person is placed in.

A system for adjusting a seat that includes one or more adjustable physical features includes a computing network including a processing device in communication with one or more computer memory storage devices; and the computer network further configured to implement a method for adjusting a seat that includes one or more adjustable physical features, the method further including for each person within a plurality of persons, calibrating the seat by determining a preferred setting for each of the one or more adjustable physical features of the seat; utilizing the determined preferred settings to determine a tight cluster from among a plurality of tight clusters within which each of the plurality of persons is placed; identifying one of the persons; and for the identified person, adjusting each of the one or more physical features of the seat to the preferred setting depending on the one of the plurality of clusters that the identified person is placed in.

BRIEF DESCRIPTION OF THE DRAWINGS

Referring to the exemplary drawings wherein like elements are numbered alike in the several Figures:

FIG. 1 is a block diagram of a physical location in which an exemplary embodiment of the system and method of the present invention may operate in;

DETAILED DESCRIPTION

Disclosed herein is a system and method for adjusting a seat used on commercial airplanes and the like. Briefly stated, each person who travels on an airplane has his/her biometric information relating to various physical characteristics of that person measured or collected prior to boarding an airplane for a flight. Based on the collected biometric information, each person is placed into one of a plurality of relatively tight clusters deemed most appropriate for that person in terms of ergonomic efficiency and comfort, and the cluster information is stored on a computer. Each tight cluster correlates to a set of adjustments or preferred settings for each one of the automatically adjustable physical features of a seat on an airplane and for a group of people with relatively similar physical characteristics. When a person boards the airplane after check-in, the seat automatically adjusts its physical features to that of the cluster assigned to the particular person who will sit in the seat on a particular flight. Then each time a person subsequently flies on any airline, his/her cluster information will be retrieved from an airline s computer and may be printed or stored, e.g., on the person's boarding pass or other information-bearing device (e.g., frequent flier card), and when that person checks in at any airport with any airline the seat assigned to that person will have its physical features automatically adjusted for the cluster that the person has been assigned to. In addition, any person can have his/her assigned cluster changed upon the occurrence of an event, for example, when the person makes manual adjustments to the seat he/she sits in during a flight in an amount sufficient to change that person to a different cluster. In other words, a recalibration procedure takes place in which the person is placed in a different, more appropriate cluster for his/her physical characteristics and resulting comfort level during a flight. The cluster information may be erased from the memory of the computer to protect the privacy of the traveler and the information can be subsequently obtained again when the person checks in at the onset of another travel.

Figure 1:
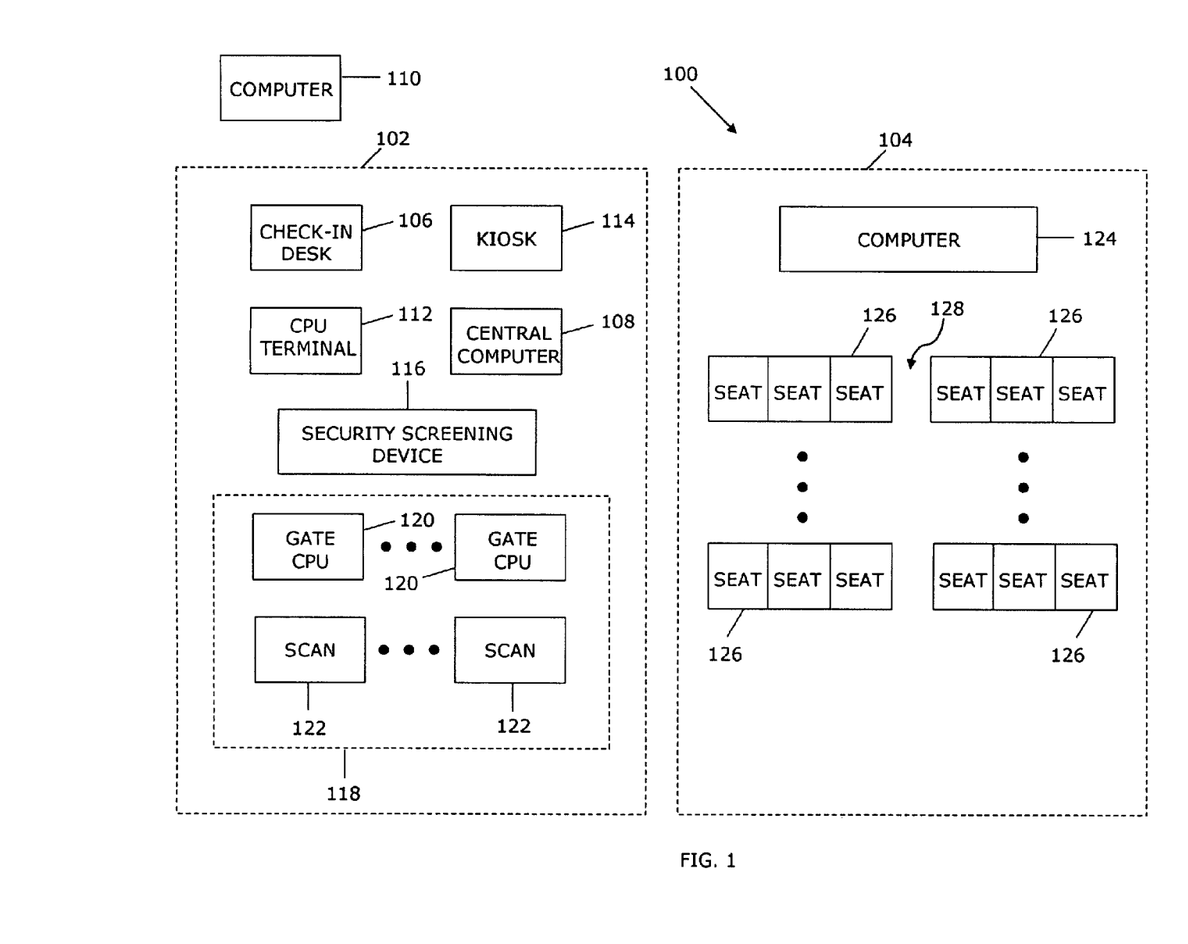

Referring initially to FIG. 1, there is shown a block diagram of a physical location that may host an exemplary embodiment of the system and method of the present invention. Illustrated in FIG. 1 is an airport 100 having at least one terminal building 102 and an airplane 104 parked at one of a plurality of gates typically present at most commercial flight airports. The airport terminal 102 includes a traditional check-in desk 106 staffed by airline personnel. After arriving at the airport 100, the person traveling usually checks in with an employee of the airline that the person will be traveling with on that particular day. This process typically includes the traveler identifying himself/herself to the airline personnel, who verifies the identity of that person through information stored on a central computer 108 located within the particular terminal 102 or at a central computer 110 for that particular airline located elsewhere in the airport 100 or outside of the airport, for example, at the headquarters of that airline. For example, each check-in desk 106 for a particular airline may have a computer (CPU) terminal 112 that connects or communicates with the central computer 108 located within the terminal 102. The central computer 108 in the terminal 102 may also be connected with the airline's central computer 110 located away from the airport 100 for communication therebetween. Also at this time, any of the traveler's luggage that will be stowed on the airplane 104 during the flight are typically tagged and handed over to the airline personnel. The traveler also receives his/her boarding pass(es) for the one or more flights that the person will make to reach his/her ultimate destination. The terminal 102 may also include a self-service kiosk 114, where the traveler can check in with the airline without the assistance of airline personnel through use of a computer that is part of the kiosk 114 to receive his/her boarding pass(es) and tag any luggage for stowage. The kiosk computer 114 may connect With the central computer 110 within the terminal 102 and/or with the airline's central computer 110 located outside of the airport 100.

If the person traveling has not flown before with an airline or airport that utilizes the system and method of the present invention, then it will be necessary for that person to have his/her biometric information measured and collected relating to one or more physical characteristics of that person. This may be achieved in an exemplary embodiment of the present invention using a security screening device 116 commonly found at most airports. Current airline regulatory rules require that each person be checked for potentially dangerous items on their person prior to boarding an airplane for a flight. This can be carried out by a scanning device 116 that scans the traveler as he/she walks through the device. Such devices 116 are generally located at a security screening area within the airport terminal 102 beyond the check-in desk and before the gate areas. The scanning device 116 may be configured to carry out the process of measuring the biometric information of the person. For example, the scanning device can measure various physical characteristics of a person, such as height, weight, leg length, arm length, shoulder width, etc. This information may be collected and stored in the central computer 108 within the terminal 102 or at the computer 110 located away from the terminal 102 for the airline that the person will fly with that day. In the alternative, the biometric information of a person can be obtained by an airline in other ways; for example, through manual entry during check-in, through entry on an airline's Internet website, or by some other automatic device located in the airport 100 that scans and determines the biometric information of a person. Regardless or how the biometric information is obtained it is stored in one or more of the airline's computers 108. 110 for subsequent use, as described in detail hereinafter. Also, different airlines may share the biometric information about each one of a plurality of persons.

FIG. 1 also illustrates one or more gate areas 118 within the airport terminal 102. Each gate area 118 typically includes one or more computers (CPUS) 120 connected or in communication with the central computer 108 at the terminal 102 for that particular airline and/or with the central computer 110 for that airline located away from the terminal. It is known for the gate computer 120 to be able to issue a boarding pass to a person traveling on an airplane leaving from that gate. Each gate area 118 also typically includes a boarding pass scanner 122 located near the entrance to the jet way that starts at the gate area 118 and ends at the entrance of an airplane 104 parked at the gate. The boarding pass scanner 122 may be connected with the computer 120 for that gate and/or also to the central computer 108 located within the terminal 102 and/or to the central computer 110 for that particular airline located away from the airport 100. When the airplane 104 parked at a gate is ready for passenger boarding, the boarding pass of each traveler is scanned by the scanner 122 to verify that each person authorized to fly on that particular flight does indeed board the airplane 104. In accordance with an alternative exemplary embodiment of the present invention, the scanner 122 may be used to read from the boarding pass the cluster information previously assigned to each person and, in response, adjust the various physical features of the seat that each person will be sitting in on that flight.

FIG. 1 also illustrates relevant portions of an airplane 104 parked at a gate and which will eventually takeoff from the airport 100 and fly to a destination airport. The airplane 104 may include a central computer 124 for storing data of various types and for executing various programs in connection with operation of the airplane. The airplane computer 124 may be in communication with the central computer 108 within the terminal 102 and/or the computer 120 at the gate area 118, and/or with the airline's central computer 110 located away from the airport 100. The airplane 104 also includes a plurality of rows of seats 126 separated by one or more aisles 128. In FIG. 1, each row contains six seats 126 grouped in sets of three seats each, with each set separated by a central aisle 128 that typically runs most of the length of the airplane 104. Generally the seats 126 are identical to one another in size and in the number and type of adjustable physical features.

Figure 2:
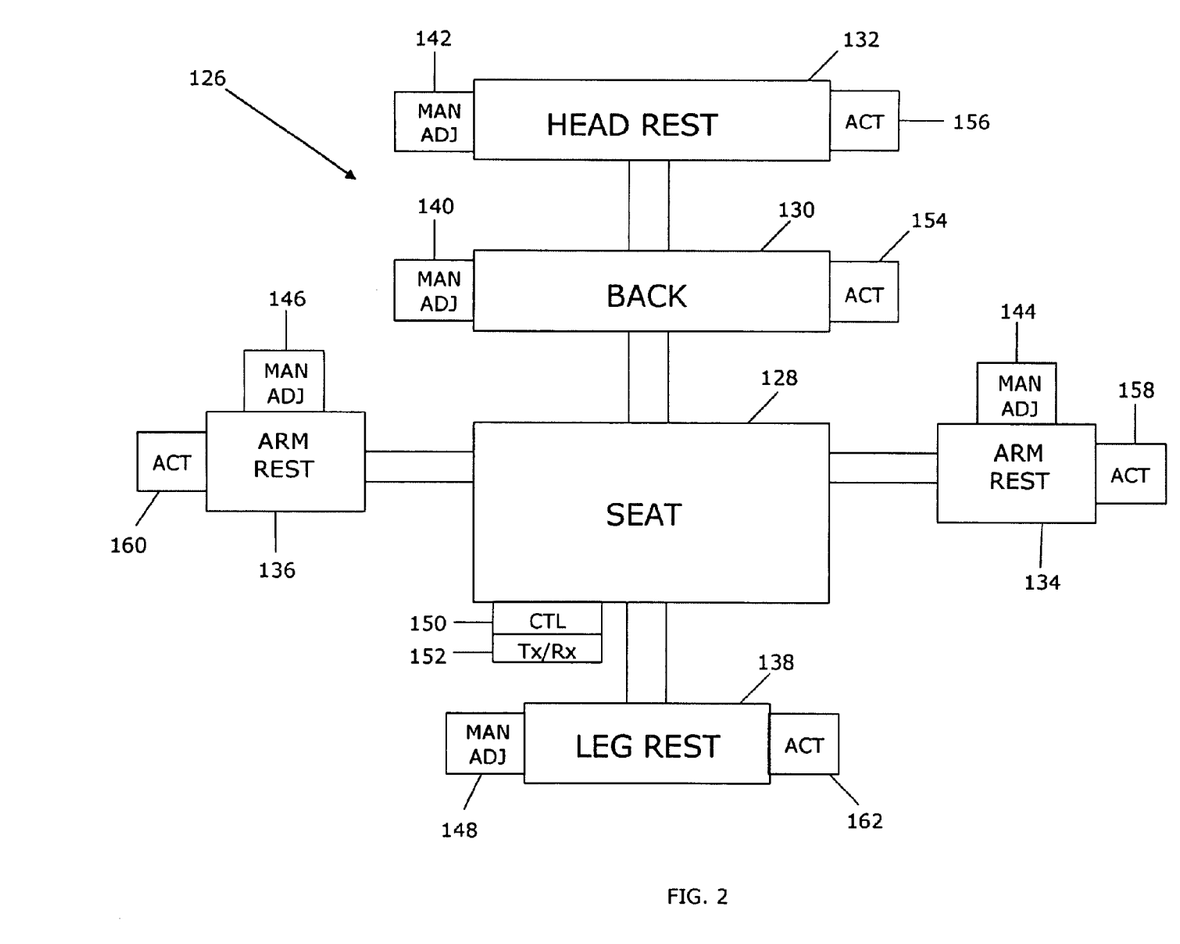
FIG. 2 is a block diagram of a seat having a plurality of adjustable physical features for use in the system and method of the present invention.

Referring to FIG. 2, there illustrated is a block diagram of one of the seats 126 on the airplane 104 of FIG. 1. The seat 126 includes a seat cushion 128 that the person sits on, a seat back 130, a headrest 132, a pair of armrests 134, 136 where one of the armrests 134, 136 may be shared with the adjacent seat 126, and a legrest 138. Most of these features 128-138 are manually adjustable by the passenger in a conventional manner through use of mechanisms activated by, e.g., buttons or levers. For example, the seatback 130 may have its angle of inclination adjustable between an upright position and somewhat of a reclined position in incremental positions therebetween. The headrest 132 may be vertically adjustable, and may also tilt forward or backward over a range of motion. Some headrests 132, particularly those in the "first" class section of the airplane 104, may have a central portion and two opposite end portions, where the end portions may be adjusted forward or backward over a range of motion. The armrests 134,136 may be adjustable over an approximate ninety-degree range of motion—essentially to move the armrest up and out of the way. The legrest 138 may swing out from its stationary vertical position over a ninety-degree angle to an approximate horizontal position, with discrete positions therebetween. FIG. 2 illustrates in block diagram form the corresponding conventional manual adjustment devices 140-148 associated with each of the manually adjustable physical features of the seat 126.

In accordance with an exemplary embodiment of the present invention, FIG. 2 also illustrates that the seat 126 has a computer control device 150 associated therewith. The control device 150 may comprise a microprocessor. Also, a combination transmitter and receiver device 152 may be a separate device or be part of the microprocessor 150. The transmit/receive device 152 allows the microprocessor 150 to communicate wirelessly or by wired connection with the central computer 124 on the airplane 104, and/or wirelessly with the central computer 108 within the terminal 102, with the airline's central computer 110 located away from the airport 100, and/or with gate computer 120. The seat 126 also includes a number of actuator devices 154-162, with each adjustable feature of the seat 126 discussed hereinabove being provided with one of the actuators 154-162 for carrying out automatic adjustment of that particular feature (e.g., the amount of tilt or inclination of the seat back 130). The actuators 154-162 are connected with the computer control device 150 on the seat 126, and may comprise known mechanical or electromechanical devices, such as DC motors, stepper motors, or other types of biasing members that are responsive to a position command to move the physical feature to a desired position. Further, each of the actuators 154-162 may be of the type in which the current position of the actuator is known to the computer control device 150 on the seat, in effect providing feedback to the computer control device 150. In the alternative, convention position sensors (not shown) may be provided to sense the position of each of the actuators 154-162 and provide that position information to the central control device 150. Power may be provided to the actuators 154-162, the control 150 and the transmit/receive device 152 through connection to the airplane's power source or to a dedicated power source for each seat (not shown).

Figure 3:
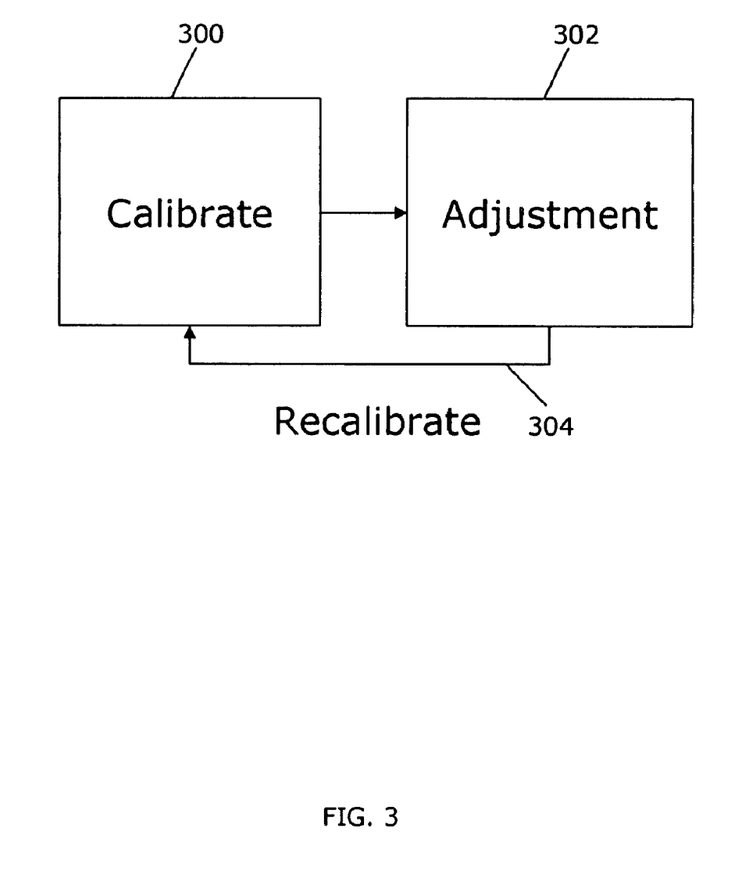
FIG. 3 is a block diagram of an exemplary embodiment of a method of the present invention.
Figure 4:
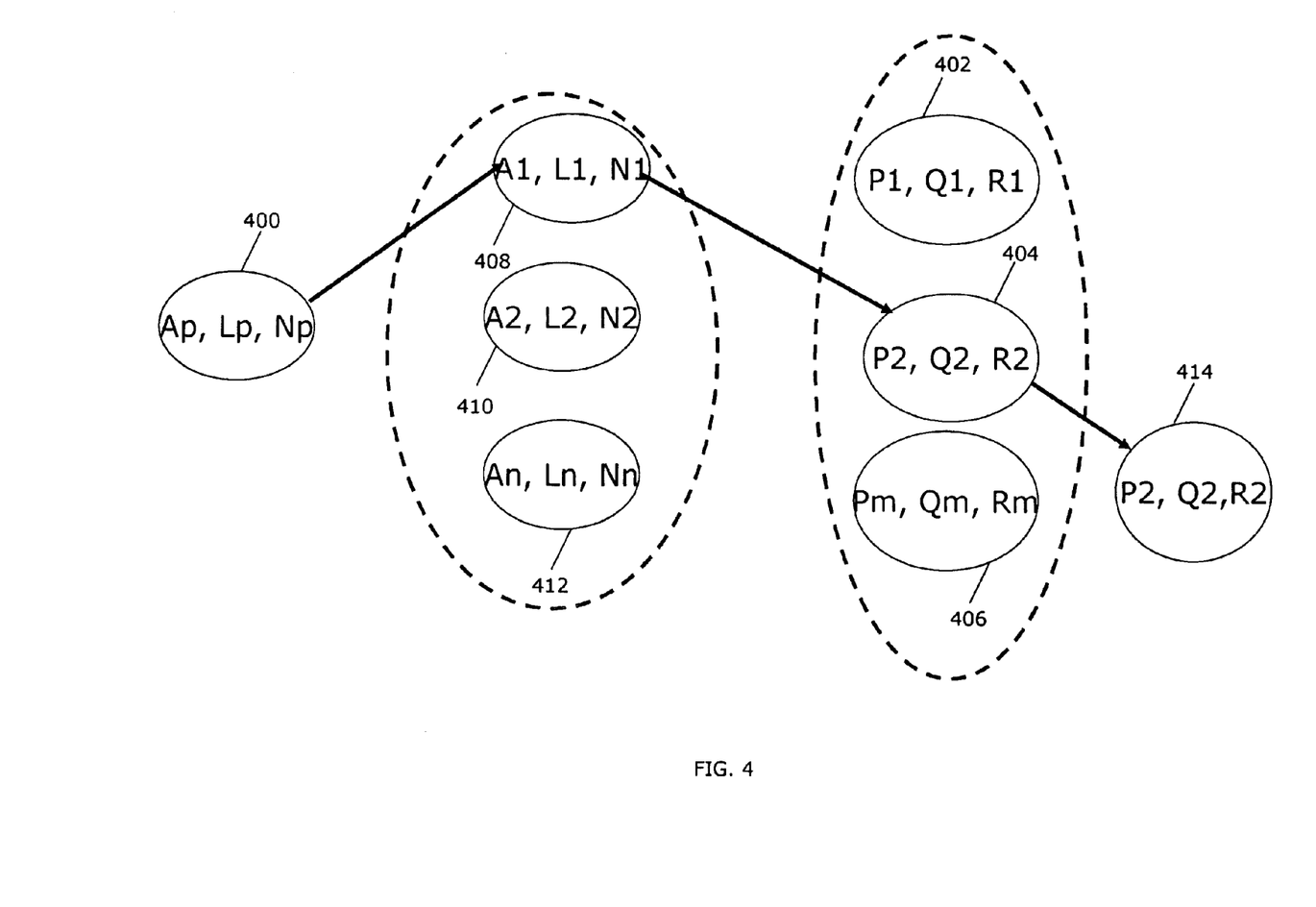
FIG. 4 is a detailed flow diagram of the method shown in FIG. 3.

Referring to FIG. 3, there illustrated is a block diagram of an exemplary embodiment of the method of the present invention. The entire method, or certain portions thereof, may be carried out, for example, by software embodied in the airline's central computer 108 located within the terminal 102, the computer 110 located away from the airport, the gate area computer 120, and/or by the computer 124 located on the airplane 104. In a calibrate block 300, the biometric information as discussed hereinabove for each one of a plurality of persons that will potentially travel with one or more different airlines is measured and collected together in a grouping of such information. FIG. 4 illustrates a grouping 400 of biometric information (e.g., Ap, Lp, Np) for a particular person. The biometric information collected for each person relates to each of a number of different physical features of the person, for example, the height, weight, armlength, leglength, shoulder width, and other relevant physical information.

In the calibrate block 300, the collected biometric information for each person is then correlated with comfort information relating to comfort levels of a cross-section of people sitting in an aircraft seat and having a certain range of values for each of a plurality of different physical features. This comfort information, which may be stored on the various one or more computers 108, 110, 120, 124 used to carry out the method of the present invention, may have been produced through empirical studies or may result from the measurement over time of comfort levels through use of the present invention. Next, for each person, the collected biometric information may be processed by regression fitting through use of, for example, a least squares method. The process determines the preferred setting for each of the various adjustable physical features on the airplane seat 126, where the preferred settings desirably relate to a comfort level of each particular person who will sit in one of the seats 126 on the airplane 104 during a flight. FIG. 4 illustrates a plurality of different preferred setting groupings (P1, Q1, R1; P2, Q2, R2; . . . Pm, Qm, Rm) 402-406 of the various adjustable physical features on the airplane seat 126. Each grouping contains information in a range of values for each of the preferred settings of the various adjustable seat features.

In the calibrate step 300 in FIG. 3, each person has his/her biometric information mapped into one of a plurality of clusters of such information. Each cluster typically includes a different range of values for each of the various different items of collected biometric information. FIG. 4 illustrates a plurality of clusters 408-412 and how a person with the specific grouping 400 of biometric information is mapped into the cluster 408. The person is mapped into this particular cluster 408 because the specific values for each of the measured biometric information parameters for this person falls within the range of values for this cluster 408. The plurality of clusters 408-412 is stored on some or all of the various computers 108, 110, 120, 124. The cluster information may be erased from the memory of the computer 108, 110, 120, 124 to protect the privacy of the traveler and the information can be subsequently obtained again when the person checks in at the onset of another travel.

In accordance with an exemplary embodiment of the present invention, creating a set of clusters may require a-priori multiple data points. The number of measurements may be at least fifty and can often go to the range of tens of thousands. To calibrate and create the clusters according to one embodiment, at the calibrate block 300 in FIG. 3, the measured data points are placed into a set of tight clusters in a D-dimensional space, where D is the number of biometric parameters measured. A tight cluster, hereinafter referred to either as a cluster or a tight cluster, as defined hereinafter, may refer to a cluster of data points wherein the bounds of the cluster are defined by straight or smooth lines (in a two-dimensional space) or flat or smooth surfaces (in a three or more dimensional space) interconnecting and enclosing the data points. For example, the tight clusters may be a group of convex hulls or ellipsoids in the D-dimensional space. A convex hull is generally defined as the smallest convex polyhedron containing a certain number of points.

Figure 5:
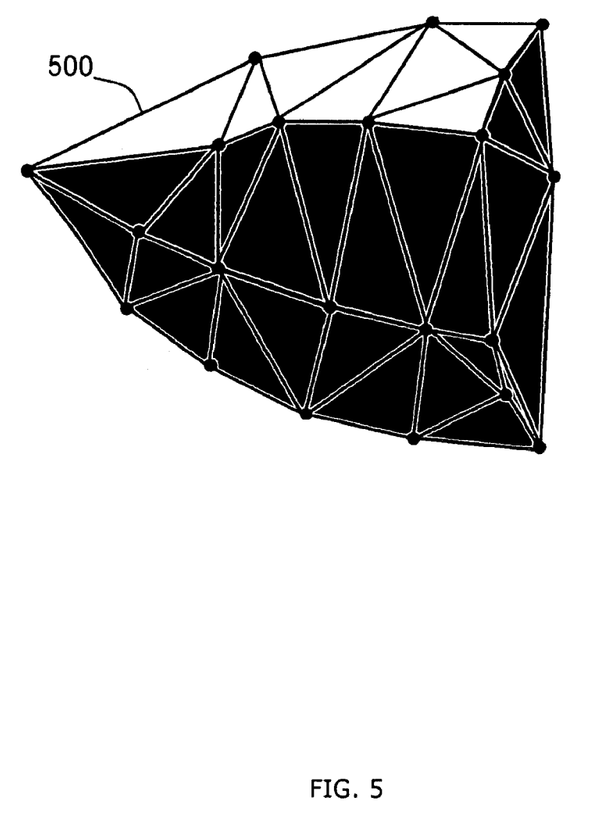
FIG. 5 is an illustration of a cluster of wafer data points in the nature of a convex hull.

The computational complexity of computing a single convex hull in a two-dimensional space is generally known as a function of N*log(N), or may be expressed as f(N*log(N)). FIG. 5 illustrates data clustering in a three-dimensional convex hull 500. In general, multiple (N) measurement or calibration data points may be clustered into a set of D-dimensional convex hulls. The complexity of computing a single convex hull in a D-dimensional space may be a function of N(D/2), or may be expressed as f(N(D/2)).

A person skilled in the art will appreciate that although convex hulls of clusters have been described above, the present invention is not limited in this respect. Other types of tight clusters besides convex hulls, such as ellipsoids or spheres clusters in a D-dimensional space (D>=2), may be used as well to divide wafer calibration or measurement data points into clusters. In yet another embodiment, clusters may be modeled with any convex functions such as a Gaussian function.

There are many methods for performing clustering effectively that may be categorized into two types: for example, a supervised clustering and an unsupervised clustering. In the case of supervised clustering, the number of clusters is known a-priori. In case of unsupervised clustering, the number of clusters is not known a-priori. The algorithm decides the best number of clusters based on the distance metric or other specified properties.

By applying an unsupervised clustering approach, in one embodiment one can first decide a set of variables. The variables may include, among others, a dimensional variable from calibration with a minimum and a maximum value; the number of divisions for each dimension, e.g., a number at approximately ten to bin or separate biometric parameters obtained from calibration; and minimum number of points in a grid, e.g., 0.2% of the total number of data points for a grid to be eliminated. Here the points may be biometric process parameters associated with the calibration data points. In this exemplary embodiment, one skilled in the art can divide the space of process parameters, in all the given dimensions, into a spatial grid according to the decided division. Within each grid block, the number of biometric parameters or data points may be counted. If the number of points or biometric parameters inside a grid is less than the decided minimum number of points and whose neighbors also have points less than the minimum number, the above grid block is eliminated. The remaining grid blocks are then combined to form clusters. The clusters may be eventually smoothed out using a Gaussian function or a convex hull as described above.

Illustrated next in FIG. 3 is an adjustment block 302. After the person who will be traveling on a flight has been affirmatively identified at the airline terminal check-in desk 106, the kiosk 114 or in the gate area 118, that person's cluster information stored in the various airline computers 108, 110, 120, 124 is retrieved from one or more of the computers. FIG. 4 illustrates an example of a specific person having the grouping 400 of biometric information that was previously mapped to the cluster 408. As mentioned, the assigned cluster 408 for that person may be printed out on the boarding pass, which also contains that person's seat assignment for the flight. Then, when the person has his/her boarding pass scanned by the scanner 122 at the gate area 118, the various physical features of the assigned seat 126 on the airplane 104 for that person are automatically adjusted to the preferred settings for that person. As described hereinabove, these preferred settings are stored within a particular grouping, as illustrated in FIG. 4 (e.g., the grouping 404 containing the adjustment values of P2, Q2, R2 for the passenger's assigned seat). This particular grouping 404 of preferred settings is selected as the "output" grouping 414, as illustrated in FIG. 4. The person may then board the airplane 104 and sit in his/her assigned seat 126 which is automatically adjusted to the preferred ergonomic or comfort settings for that person. The same method may be carried out for some or all other passengers on that flight. Also, after the flight has been completed and the particular airplane 104 will be used for another flight the method of the present invention may be utilized to adjust any seat 126 on that airplane 104 to the preferred settings of another different passenger that will now sit in the seat 126 previously occupied by a different person on the prior flight.

Referring to FIG. 3, a feedback or recalibrate step 304 is illustrated. In this step, the preferred settings for a certain person can be changed by that person for various reasons. For example, if the person becomes uncomfortable during a flight, the person can manually adjust one or more of the adjustable physical features of the seat 126 to achieve a relatively greater level of comfort. Alternatively, a person may not have flown for some time and his/her physical characteristics may have changed over that period of time. As a result, the previous preferred settings for that person may not be as accurate from an ergonomic or comfort standpoint. If the amount of manual adjustment carried out by that person on one or more of the adjustable physical features of the seat 126 are sufficient to place that person within a different cluster 408-412, then this new cluster information may be communicated by the central control unit 150 (FIG. 2) for that seat 126 to one or more of the computers 108, 110, 120, 124 for storage and subsequent usage.

Referring to FIG. 4, wherein the biometric parameters 400 of an incoming traveler are fitted to one of the existing clusters created a-priori in the calibrate step 300 of FIG. 3. Clusters divide the D-dimensional space into two regions, i.e., an interior region and an exterior region. Hereinafter described is a method for determining if a point is in the interior or exterior of a cluster according to embodiment of the invention. For simplicity a two dimensional space is used and a convex hull cluster is chosen. According to one embodiment, the point in the D-dimensional space may be compared against a set of convex hulls. The cluster geometric structures may be expressed by a set of inequalities. In case of a convex hull, the set of inequalities may look like:

$$\text{SUM}_k(a_{ij} \cdot x_j) <= b_{jk}$$

where i=1, . . . , n (number of inequalities), j=1, . . . , m (number of dimensions) and k=1, . . . , o is the number of independent clusters. In the case of ellipsoids, there is only one inequality that can be expressed as:

$$\text{SUM}_k(a_j \cdot x_{j2}) + \text{SUM}_k(c_{ij} \cdot x_i x_j) <= b_{jk}$$

where i,j=1, . . . , m (number of dimensions), and k=1, . . . , is the number of independent clusters and $c_{ij}$ denotes all the cross terms.

According to one embodiment, a given point that satisfies all the inequalities is considered to be inside the clusters and, thus, safe. According to another embodiment, for a given point the estimate can be made less conservative by increasing the value of $b_{jk}$ to $b_{jk}(1+\alpha)$, where $\alpha$ is a variable whose default value is 0.1.

According to another embodiment before testing whether a point is in the interior or exterior of a cluster, the clusters may be scaled up or down, preferably uniformly, by a small factor to create another convex cluster. The scaling factor may be manually defined, which may be a parameter based on the acceptable reliability of the lithographic process model.

Figure 6:
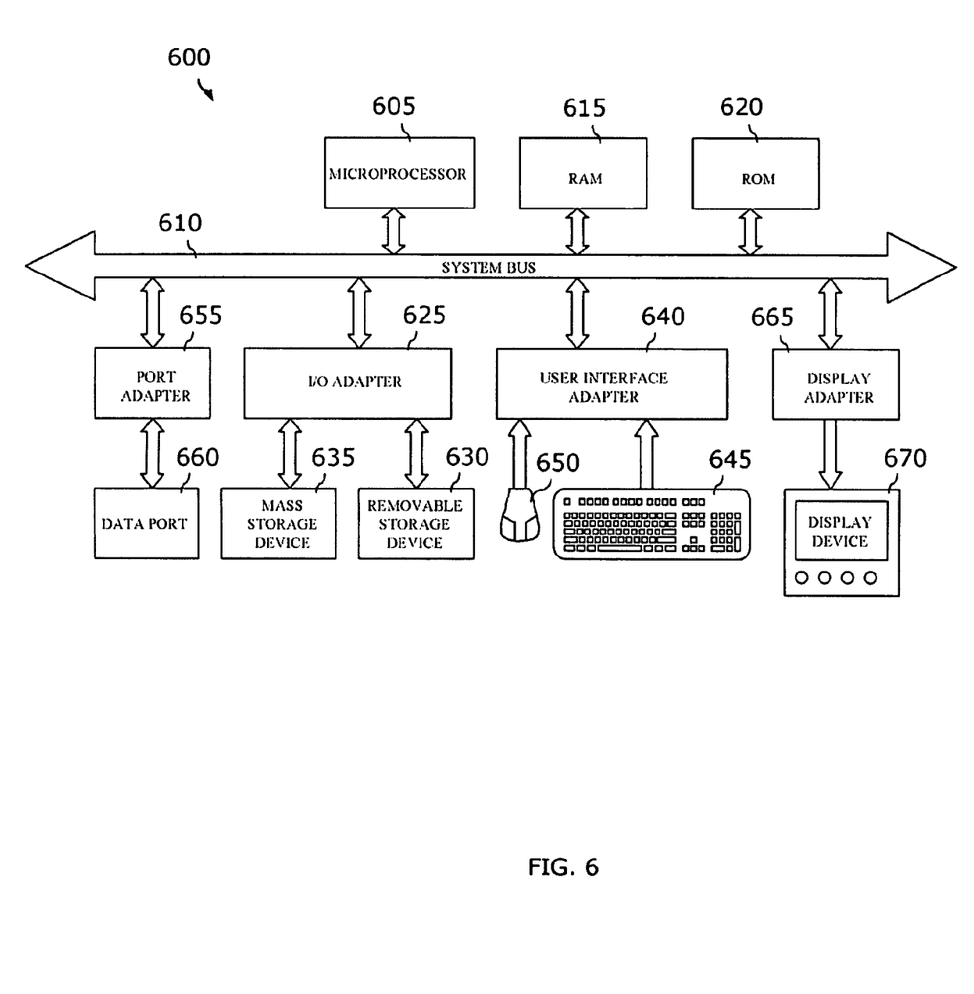
FIG. 6 is a schematic block diagram of a general-purpose computer suitable for practicing embodiments of the present invention.

Generally, the method embodiments for adjusting of a seat that includes one or more adjustable physical features may be practiced with a general-purpose computer and the method may be coded as a set of instructions on removable or hard media for use by the general-purpose computer. FIG. 6 is a schematic block diagram of a general-purpose computer 600 suitable for practicing embodiments of the present invention. This computer 600 may comprise a portion or all of any one or more of the computers 108, 110, 120, 124, described hereinabove. In FIG. 6, computer system 600 has at least one microprocessor or central processing unit (CPU) 605. CPU 605 is interconnected via a system bus 610 to a random access memory (RAM) 615, a read-only memory (ROM) 620, an input/output (I/O) adapter 625 for a connecting a removable data and/or program storage device 630 and a mass data and/or program storage device 635, a user interface adapter (40 for connecting a keyboard 645 and a mouse 650, a port adapter 655 for connecting a data port 660 and a display adapter 665 for connecting a display device 670.

ROM 620 contains the basic operating system for computer system 600. The operating system may alternatively reside in RAM 615 or elsewhere as is known in the art. Examples of removable data and/or program storage device 630 include magnetic media such as floppy drives and tape drives and optical media such as CD ROM drives. Examples of mass data and/or program storage device 635 include hard disk drives and non-volatile memory such as flash memory. In addition to keyboard 645 and mouse 650 other user input devices such as trackballs, writing tablets, pressure pads, microphones, light pens and position-sensing screen displays may be connected to user interface 640. Examples of display devices include cathode-ray tubes (CRr) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 630, fed through data port 660 or typed in using keyboard 645.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIG. 3.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for adjusting an airplane seat that includes one or more adjustable physical features, comprising:
   collecting, by a computer, biometric information relating to one or more physical characteristics of an airline passenger from the airline passenger prior to the airline passenger boarding an airplane comprising the airplane seat;
   correlating comfort information to the collected biometric information of the airline passenger;
   regression fitting the collected biometric information to determine a preferred setting for each of the one or more physical features of the airplane seat, wherein the preferred setting for each of the one or more physical features relates to the correlated comfort information of the airline passenger; and
   adjusting the one or more physical features of the airplane seat to the preferred setting of the airline passenger.

2. The method of claim 1,
   further comprising storing the preferred setting of the airline passenger in a computer, and in the event the airline passenger subsequently is assigned a second airplane seat having one or more respective physical features, adjusting the one or more respective physical features of the second airplane seat that is assigned to the airline passenger to the preferred setting of the airline passenger.

3. The method of claim 1 wherein the biometric information of the airline passenger is collected from measurements made by a scanning device located in a security screening area in an airport terminal.

4. The method of claim 1, further comprising updating the preferred setting of the airplane passenger based on a manual adjustment made to at least one of the one or more physical features of the airplane seat by the airplane passenger while the airplane passenger is seated in the airplane seat.

5. The method of claim 1, further comprising automatically adjusting each of the one or more physical features of the seat to the preferred setting of the airline passenger in response to the airline seat being assigned to the airline passenger.

6. The method of claim 1, wherein the biometric information of the airline passenger is entered into a computer by the airline passenger prior to the airplane seat being assigned to the airplane passenger.

7. The method of claim 1,
   further comprising storing the preferred setting of the airline passenger in a computer that is associated with a first airline, the first airline being associated with the airplane that comprises the first airplane seat; and
   sharing the preferred setting of the airline passenger by the computer associated with the first airline with a computer associated with a second airline in the event the airplane passenger is subsequently assigned a third airplane seat that is associated with the second airline.

8. A computer program product, comprising:
   a non-transitory computer readable computer program code for implementing a method for adjusting an airplane seat that includes one or more adjustable physical features; and instructions for causing a computer to implement a method, the method further including:

collecting, by a computer, biometric information relating to one or more physical characteristics of an airline passenger from the airline passenger prior to the airline passenger boarding an airplane comprising the airplane seat;

correlating comfort information to the collected biometric information of the airline passenger;

regression fitting the collected biometric information to determine a preferred setting for each of the one or more physical features of the airplane seat, wherein the preferred setting for each of the one or more physical features relates to the correlated comfort information of the airline passenger; and adjusting the one or more physical features of the airplane seat to the preferred settings of the airline passenger.

9. The computer program product of claim 8, further comprising storing the preferred settings of the airline passenger in a computer, and in the event the airline passenger subsequently is assigned a second airplane seat having one or more respective physical features, adjusting the one or more respective physical features of the second airplane seat that is assigned to the airline passenger to the preferred settings of the airline passenger.

10. The computer program product of claim 8 wherein the biometric information of the airline passenger is collected from measurements made by a scanning device located in a security screening area in an airport terminal.

11. The computer program product of claim 8, further comprising updating the preferred setting of the airplane passenger based on a manual adjustment made to at least one of the one or more physical features of the airplane seat by the airplane passenger while the airplane passenger is seated in the airplane seat.

12. The computer program product of claim 8, further comprising automatically adjusting each of the one or more physical features of the seat to the preferred setting of the airline passenger in response to the airline seat being assigned to the airline passenger.

13. The computer program product of claim 8, further comprising storing the preferred setting of the airline passenger in a computer that is associated with a first airline, the first airline being associated with the airplane that comprises the first airplane seat; and sharing the preferred setting of the airline passenger by the computer associated with the first airline with a computer associated with a second airline in the event the airplane passenger is subsequently assigned a third airplane seat that is associated with the second airline.

14. The computer program product of claim 8, wherein the biometric information of the airline passenger is entered into a computer by the airline passenger prior to the airplane seat being assigned to the airplane passenger.

15. A system for implementing adjusting of an airplane seat that includes one or more adjustable physical features; comprising:

a computing network including a processing device in communication with one or more computer memory storage devices; and the computing network further configured to implement a method for adjusting a seat that includes one or more adjustable physical features, the method further including:

collecting, by a computer, biometric information relating to one or more physical characteristics of an airline passenger from the airline passenger prior to the airline passenger boarding an airplane comprising the airplane seat;

correlating comfort information to the collected biometric information of the airline passenger;

regression fitting the collected biometric information to determine a preferred setting for each of the one or more physical features of the airplane seat, wherein the preferred setting for each of the one or more physical features relates to the correlated comfort information of the airline passenger; and adjusting the one or more physical features of the airplane seat to the preferred settings of the airline passenger.

16. The system of claim 15, further comprising storing the preferred settings of the airline passenger in a computer, and in the event the airline passenger subsequently is assigned a second airplane seat having one or more respective physical features, adjusting the one or more respective physical features of the second airplane seat that is assigned to the airline passenger to the preferred settings of the airline passenger.

17. The system of claim 15, wherein the biometric information of the airline passenger is collected from measurements made by a scanning device located in a security screening area in an airport terminal.

18. The system of claim 15, further comprising updating the preferred setting of the airplane passenger based on a manual adjustment made to at least one of the one or more physical features of the airplane seat by the airplane passenger while the airplane passenger is seated in the airplane seat.

19. The system of claim 15, further comprising automatically adjusting each of the one or more physical features of the seat to the preferred setting of the airline passenger in response to the airline seat being assigned to the airline passenger.

20. The system of claim 15, further comprising storing the preferred setting of the airline passenger in a computer that is associated with a first airline, the first airline being associated with the airplane that comprises the first airplane seat; and sharing the preferred setting of the airline passenger by the computer associated with the first airline with a computer associated with a second airline in the event the airplane passenger is subsequently assigned a third airplane seat that is associated with the second airline.

* * * * *